INVENTOR.
CANDIDO JACUZZI
BY
Bruce & Brosler
HIS ATTORNEYS 3,178,024
FILTER SYSTEM ASSEMBLY
Candido Jacuzzi, Lafayette, Calif., assignor to Jacuzzi
Bros., Incorporated, a corporation of California
Filed June 13, 1960, Ser. No. 35,580
4 Claims. (Cl. 210—253)

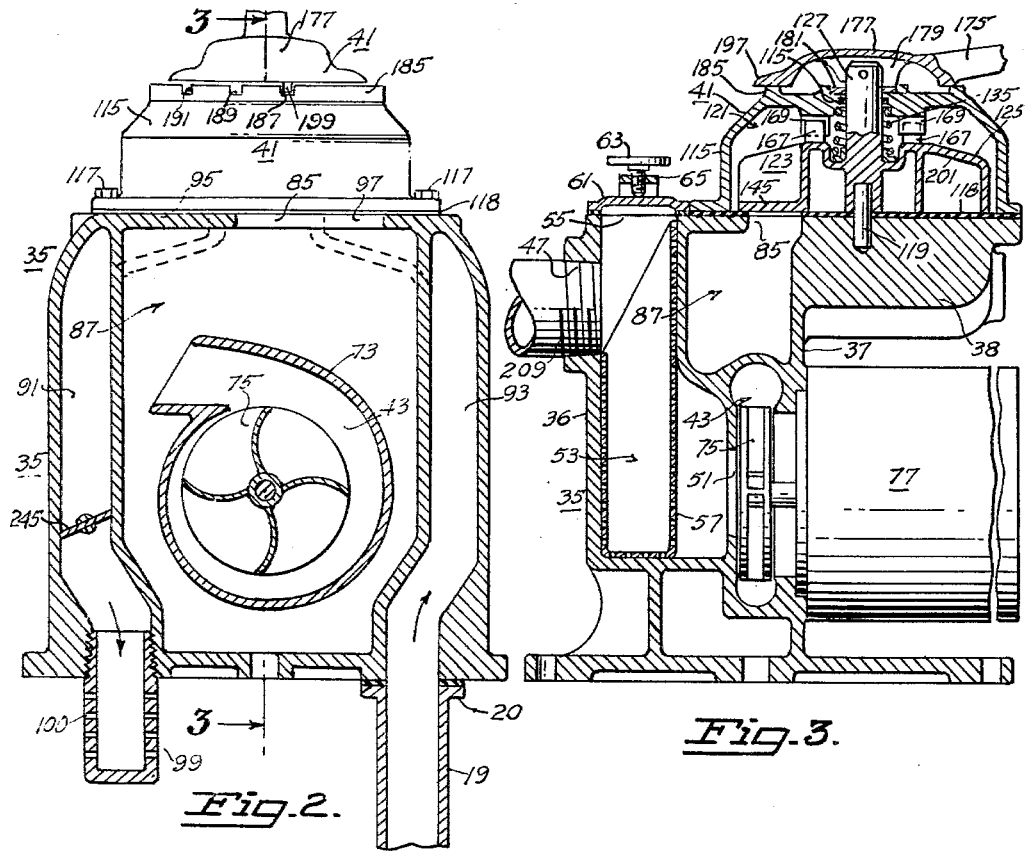
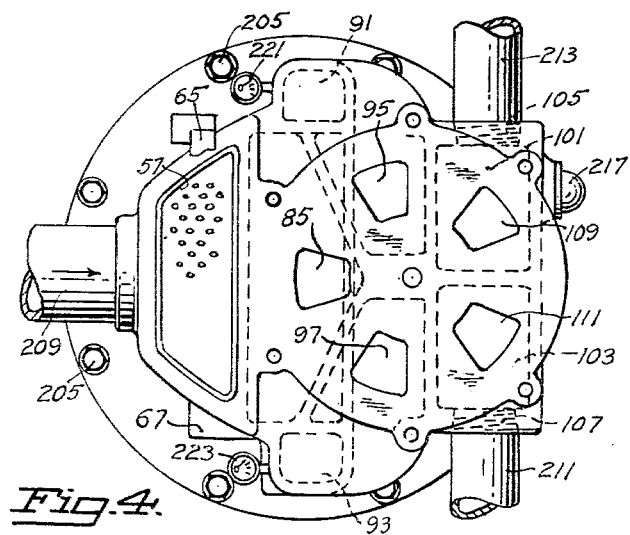

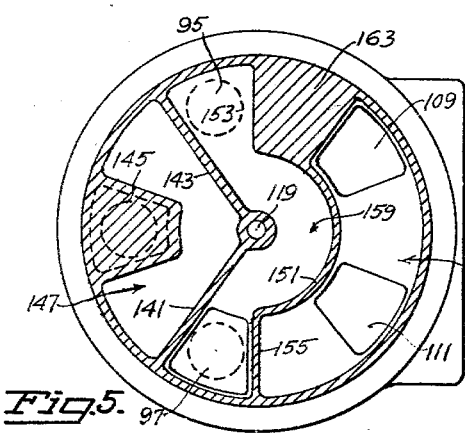
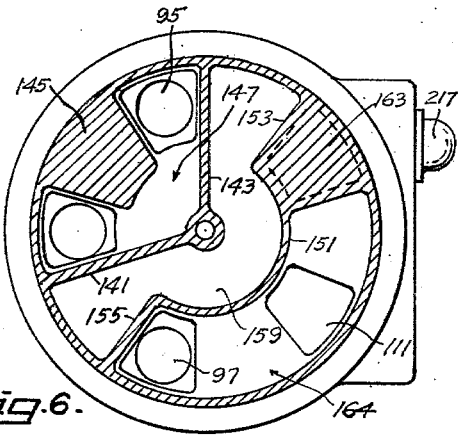
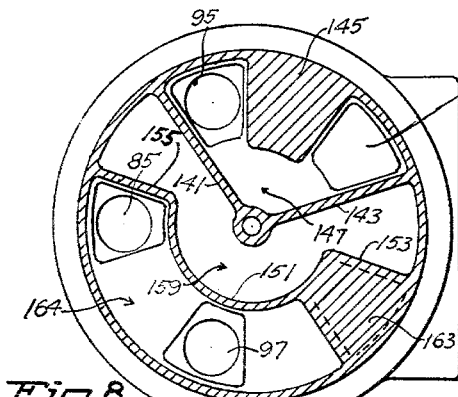
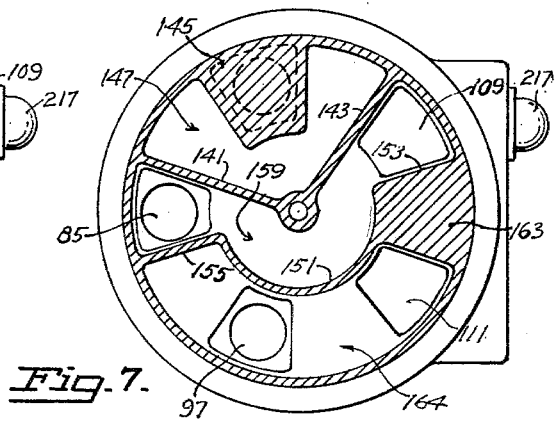
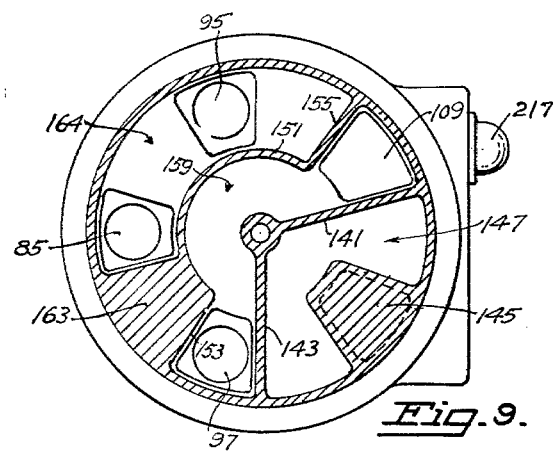
INVENTOR.
CANDIDO JACUZZI
HIS ATTORNEYS April 13, 1965  C. JACUZZI  3,178,024
FILTER SYSTEM ASSEMBLY Filed June 13, 1960  4 Sheets-Sheet 4

My invention relates to filters and more particularly to a filter system assembly adaptable for use with swimming pools and the like.

The construction of swimming pools is normally accompanied by the installation of a filter system for servicing the pool and maintaining the pool water filtered and clean. Such system includes a filter, a motor for pumping water from the pool through the filter, and a multi-way valve assembly for effecting various system combination connections for accomplishing different objectives such as filtering, backwashing of the filter, and by-passing the filter to pump water directly from the pool into a drain or sewer system.

Among the objects of my invention are:
(1) To provide a novel and improved filter system assembly;
(2) To provide novel and improved filter system assembly which is simple and convenient to set up;
(3) To provide a novel and improved filter system assembly which can effect major economies in packaging and shipping;
(4) To provide a novel and improved pump-valve unit assembly for use in a filter system.

Additional objects of my invention will be brought out in the following description of a preferred embodiment of the same, taken in conjunction with the accompanying drawings, wherein:

FIG. 2 is a view in section through a pump-valve unit assembly constituting an important aspect of the filter system assembly of FIG. 1;

FIG. 3 is a view in section taken in the plane 3—3 of FIG. 2;

FIG. 4 is a plan view of the pump unit assembly of FIG. 2, with parts removed to expose interior structure;

FIGS. 5–9 are views depicting various flow combinations capable of being accomplished by a multi-way valve assembly employed in the system;

Figure 1:
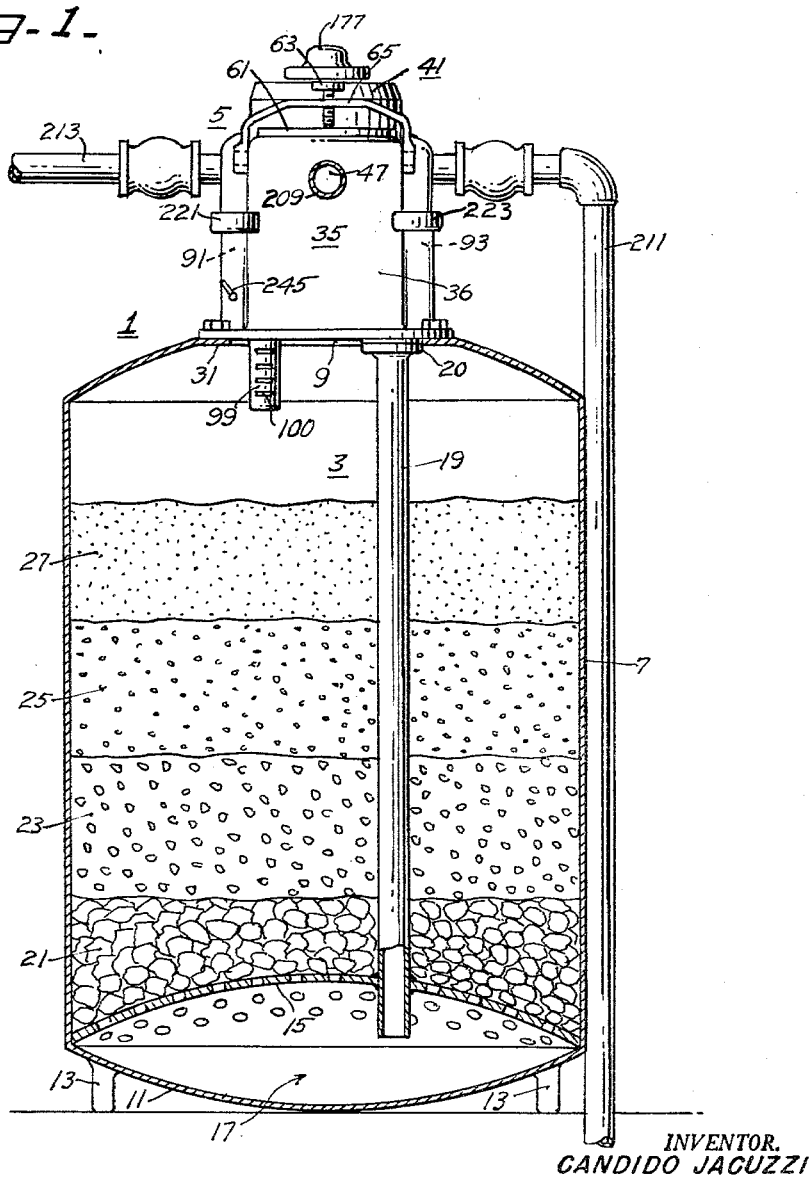
FIG. 1 is a sectional view in elevation of a filter system assembly of the present invention.
Figure 10:
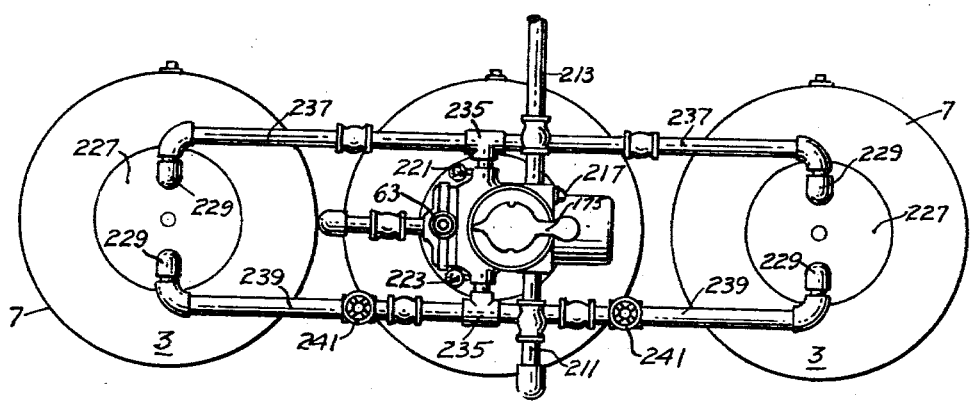
FIG. 10 is a plan view of a multiple filter assembly incorporating the present invention.

Referring to the drawings for details of my invention in its preferred form, the filter system assembly 1 may be considered as involving two main sub-assemblies, (1) a tank assembly 3 and (2) a pump-valve unit assembly 5.

The tank assembly involves a tank 7 having an opening 9 of the manhole type in the upper end thereof, a concave bottom 11 and legs 13, and a convex, false, preferably perforated bottom 15, adapted to support filter material while permitting liquid flow thereby, the perforated false bottom forming a chamber 17 with the tank bottom 11. A pipe 19 passes through the false bottom and is welded thereto, with its lower end in the chamber 17 and its upper end terminating preferably in a flange 20.

In accordance with conventional practice, the filter material may comprise a plurality of layers 21, 23, 25, 27, etc. of gravel and sand built upon the false bottom 15 with the average particle size of the layers gradually decreasing toward the upper layer.

The opening 9 in the upper end of the tank is bounded by a horizontal flange 31 having a plurality of threaded bolt receiving recesses uniformly spaced therearound to provide for the mounting and installation of the pump-valve unit assembly 5.

Such pump-valve unit assembly includes a pump housing 35, having a front wall 36, a rear wall 37 and an upper extension 38 to the rear, the upper end of the housing being planar to provide for the mounting of a multi-way valve assembly 41.

Within the housing is a pump chamber 43, the input to which is defined by a passageway leading from a threaded inlet opening 47 in the front wall 36 of the housing, and terminating at a suction opening 51 in the pump chamber, the passageway being enlarged intermediate the two openings to provide a compartment or pocket 53 having an opening 55 to atmosphere, to permit for the insertion of a screen basket 57. This screen basket will serve to trap and remove from any inflowing water, debris which may enter with the water and thus prevent the same from gaining access to the pump chamber.

A cover 61 applied over the opening 55 is held in place by a pressure screw 63, passing through a yoke 65 which straddles the cover and is removably anchored to lateral anchor flanges 67.

The pump chamber is preferably designed to provide a housing 73 for a pump rotor 75 driven by a motor 77 mounted against the rear wall of the pump chamber below the rearward extension 38.

Within the area covered by the multi-way valve assembly 41 is an opening 85 marking the termination of a discharge passageway from the pump, including a chamber 87.

The pump is preferably of the impeller type, in which case the rotor will constitute an impeller and the rotor housing will define a volute discharging into the chamber 87.

Extending through the housing 35 independently of the pump chamber and discharge passageway, are a pair of passageways 91, 93 each terminating at one end in the bottom wall of the housing, and at its other end in an opening 95, 97 respectively in the top planar wall within the area covered by the valve assembly 41. The lower end of the one passageway 91 is preferably threaded for coupling thereto, a diffuser nozzle 99 in the form of a short closed ended pipe section having a plurality of slits 100 in the cylindrical wall thereof.

Also extending through the housing independently of the pump chamber is another pair of passageways in the form of chambers 101, 103 each terminating at one end in a preferably threaded opening 105, 107 respectively, facing laterally of the housing, while at its other end, each passageway terminates in an opening 109, 111 respectively in the upper planar wall within the area of the multi-way valve assembly 41.

The terminal openings 85, 95, 97, 109 and 111 in the upper planar wall are preferably arranged in a circle for cooperation with the multi-way valve assembly to permit various combination arrangements between the end 85 of the pump discharge passageway and the remaining passageway openings in the upper wall.

The multi-way valve assembly 41 may comprise a housing in the form of a flanged cover 115 affixed to the upper end wall by cap screws 117 through the flange thereof, the cover being preferably sealed to the upper end wall by an intermediate sealing layer 118 having cut-outs matching the openings 85, 95, 97, 109 and 111.

Centrally of the area spanned by the cover 115, the planar wall is recessed to frictionally receive a shaft pin 119, such pin being preferably forced or driven into position to preclude rotation thereof.

The cover defines with the upper end wall, a valve chamber 121 in which is rotatably positioned for adjustment, a valve or port body 123, the purpose of which is to provide for selectively coupling the various passageways leading to and from the valve assembly.

The valve or port body is a generall hollow open ended body 125 having an integral central shaft 127 terminating at one end in the plane of the open end of the port body and at its other end, extending beyond said body. The port body is installed in the housing with its open end facing the upper end wall of the pump housing 35 and preferably in contact with a layer of sealing material set into the upper end wall.

The lower end of the shaft 127 is recessed to slidably fit over the exposed end of the shaft pin 119 while the extending end of the shaft passes through an O-ring seal 131 in the cover 115.

The port body is recessed about its shaft 127 to receive one end of a compression spring 135 disposed under compression, between the port body 123 and the cover 115, such spring serving to maintain the port body in pressure sealing engagement with the sealing layer 118.

The specific configuration and construction of the port body is controlled by the various connecting functions which it is intended to perform, such functions being accomplished by a combination of integral hole cover sections and partition walls incorporated into the body structure.

In the specific multi-way valve assembly depicted in the drawings, a partition wall formed of two radial sections 141, 143 is adapted, in one position, to span an angle sufficient to encompass a pair of the openings in the upper end wall, while intermediate the radial sections, in an area not occupied by such openings, is a cover section 145. This partition wall and cover section define a corridor or passageway 147 capable of interconnecting a pair of openings, while the cover section 145 occupies a space between such openings (FIG. 6). With the cover section shifted to a position blocking an opening (FIG. 5), the passageway 147, performs no connecting function, in the specific form illustrated.

A second partition wall extending across the port body and including an intermediate semi-circular section 151 terminating in a radial section 153, 155 at each end respectively defines with the first partition wall, a corridor or passageway 159 of sufficient width at each end to enable it to simultaneously expose a pair of openings, when the port body is properly positioned to bring this passageway into registry with such openings (FIG. 5).

Integral with this second partion wall and located adjacent one of the radial sections thereof, is a cover section 163 adapted, like the cover section 145, to cover and block an opening when positioned over such opening. Bounded by the second partition wall, the cover section 163, and the rim of the port body, is an arcuate area spanning in excess of two openings, thus defining an arcuate compartment 164.

With the port body in the position of adjustment depicted in FIG. 5, the opening 85 from the discharge passageway of the pump will be blocked off, thus cutting off flow in the system.

Rotation of the port body in clockwise direction to its first operational position as depicted in FIG. 6, will effect a flow connection from the pump discharge passageway opening 85 to the opening 95 leading to one of the passageways 91 leading down to the filter, while leaving the other opening 97 associated with the passageway 93 to the filter open for return flow from the filter. From the opening 97, a flow connection is established to opening 111 leading down to the lateral passageway 103.

In its next positional adjustment, as illustrated in FIG. 7 the pump discharge passageway will be flow connected directly through corridor 159 the flow passageway 101 leading out of the housing, none of the other flow passageways in the pump housing being affected.

The next positional adjustment of the port body, as depicted in FIG. 8, brings the pump discharge passageway directly into flow connection with opening 97 leading to the passageway 93 connected with the filter, leaving the other passageway 91 to the filter open for flow connection to opening 109 leading to the passageway 101 from the housing.

The final permissible adjustment of the port body, illustrated in FIG. 9, connects the pump discharge passageway to the first passageway 91 leading to the filter, the other passageway to the filter being open for direct flow connection to the discharge passageway 101 via the opening 109.

The initial and final adjustment position of the port body as depicted in FIG. 5 and FIG. 9, may be fixed by abutment of a suitable stop 167 located on the port body, with a boss or cooperating stop 169 depending from the cover 115 in the path of travel of the first stop.

To facilitate the making of the many described adjustments of the valve assembly, a handle 175 is provided at the exposed end of the port body shaft 127, such handle constituting a lever having a domed end 177 with depending spaced fulcrum cam lugs 179 adapted to straddle the exposed end of the port body shaft 127 and be pivoted thereto by a pivot pin through the shaft and fulcrum lugs. The handle with the fulcrum cam lugs in engagement with the upper side of the cover, enable the port body 123 to be lifted from its sealing engagement with the sealing layer 118 in preparation for rotating the same by a swing of the handle. If desired, a readily replaceable wear plate 181 may be disposed about the shaft 127 along the path of movement of the fulcrum lugs, to avoid wear on the upper surface of the cover proper.

By thus lifting the port body from its sealing engagement with the sealing layer, frictional drag at this point is eliminated completely during adjustments of the port body within the valve assembly housing.

To guide an operator in the making of such adjustments, the valve assembly cover is provided with a circular rib 185 surrounding the shaft 127, and such rib is provided with adjustment determining notches 187, 189, 191 . . . etc. For cooperation with such notches in locating the adjustable positions of the port body, the handle is cast with an integral pointer 197 overlying the rib and including a depending positioning rib 199, such rib being adapted to move along the upper edge of the circular rib so long as the handle is depressed to lift the port body from its seat against the sealing material.

By releasing the handle, the positioning rib may be caused to enter one of the notches to set the adjustment of the valve assembly at the position determined by the operator. To facilitate such determination, suitable symbols may be cast integral with the cover at appropriate points thereon, or otherwise applied.

In lifting the port body, preliminary to making an adjustment, liquid will gain access to that portion of the housing between the port body and the cover, and in the absence of provision to remove the same, such liquid will become trapped therein upon release of the handle. This trapped liquid in the absence of its removal, could constitute an obstacle to lifting of the valve body for subsequent adjustments.

To bring about removal of such trapped liquid from the space behind the port body, a small bleed hole 201 is provided in the upper wall of the port body, preferably in communication with the arcuate passageway as it will be noted that regardless of the adjustment of the port body in the valve assembly, this passageway is always in communication with one of the two passageways directed out of the pump housing away from the filter. Between adjustments of the port body, sufficient of the trapped liquid will drain out to permit of the necessary lifting of the valve to effect such adjustments.

In applying the filter system of the present invention for use with a pool, the pump-valve unit assembly is first assembled to the tank assembly by cap screws 205, with a suitable gasket between the upper end of the tank pipe 19 and the lower end of the passageway 93.

A pipe connection 209 from the drain of the swimming pool is coupled to the pump housing at the inlet opening 47. A return pipe connection 211 to the pool is coupled to the pump housing at the threaded opening 107 constituting the discharge end of the passageway 103, while a pipe connection 213 from the threaded opening 105 leads to a waste drain or sewage system.

With the connection thus made, the position of the valve assembly as depicted in FIG. 5 will serve to block the intake passageway to the pump and the pool is thereby effectively disconnected.

The adjustable position of the valve assembly as depicted in FIG. 6 determines normal filtering operation of the filter system, wherein the water drawn from the pool is circulated through the filter and into the return line back to the pool. In this connection, the dispersion of the water from the dispersion nozzle 99 into the filter tank, minimizes disturbance of the filter material therein.

The adjustment illustrated in FIG. 8 determines the backwash operation of the filter system whereby sediment which may have accumulated in the filter over a period of time, is washed out of the filter and into the pipe 213 leading to a waste drain or sewer.

In the valve position of FIG. 7, the pump discharge is connected directly to the sewer, thus bypassing the filter, and this adjustment can be utilized when it is desired to lower the level or completely drain the pool.

In the final positional adjustments of the valve assembly as depicted in FIG. 9, the pump discharge is directed through the filter and then through the waste line to the sewer. This position is utilized to flush the system after backwash so that any sediment which may have filtered out in the bottom of the tank during backwash, will not be carried back into the pool but will be discharged to waste.

This same positional adjustment of the valve assembly may be used in the cleaning of the filter sand and gravel prior to putting the filter into operational use.

To judge the completion of a cleaning operation as when the valve assembly is set to the backwash adjustment of FIG. 8 or the adjustment of FIG. 9, a sight glass or bubble 217 is installed in the exposed wall of the passageway 101 to the waste line connection.

By coupling a pressure gauge 221 and 223 to each of the passages 91, 93 respectively connecting with the filter, the water pressure at both the top and the bottom of the filter tank can then be measured. Such information can be useful in determining the condition of the filter, since the difference in pressures is an indication of the "dirtiness" of the filter and the need for backwashing the same to clean out the accumulation of sediment therefrom.

Figure 11:
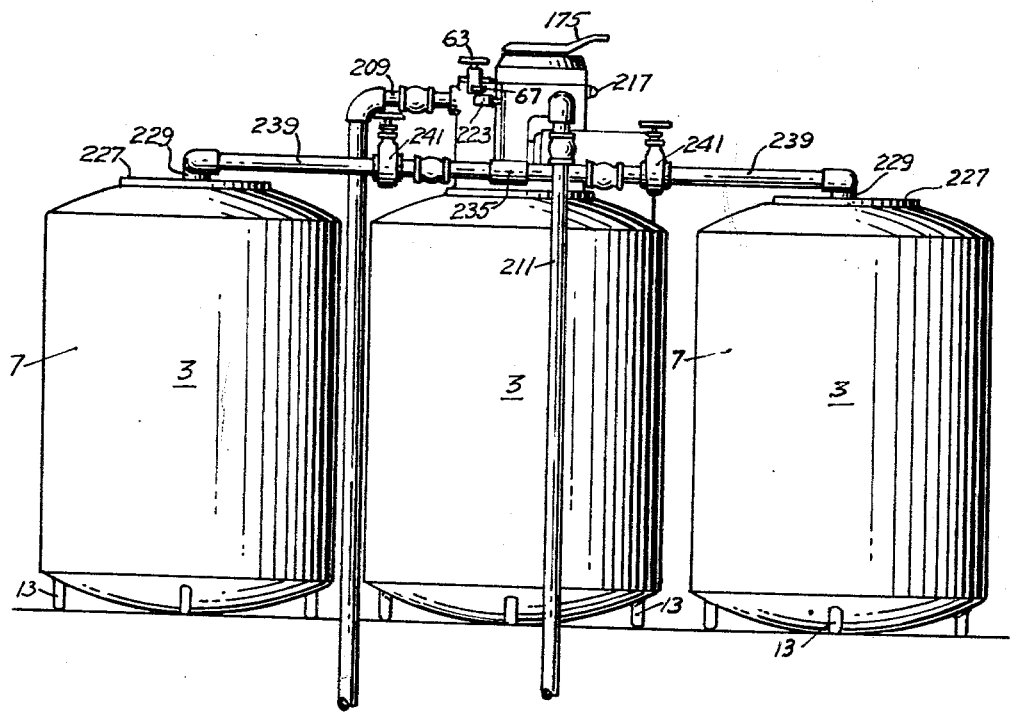
FIG. 11 is a view in elevation of the multiple filter assembly of FIG. 10.

The filter system assembly of the present invention permits in a very simplified manner, of enlarging the capacity of the system through the addition thereto of supplemental tank assemblies 1, two additional such tank assemblies being depicted in FIG. 11. This is made possible through the provision of a manhole cover 227 for each tank 7, the cover including a pair of preferably integrally cast elbows 229, the lower end of one of which is internally threaded to receive a diffuser nozzle similar to the nozzle 99 previously herein described. Each of the passageways 91 and 93 of the pump-valve unit assembly is then drilled and tapped to receive a T fitting 235 which permits of a pipe connection 237 and 239 to the corresponding passageway in the manhole cover in each of the two additional tank assemblies. In one of the pipe connections to each of such tank assemblies, is included a control valve 241 enabling one to close off the connection to each of such tanks. When so connected and valves 241 open, the three tank assemblies function simultaneously as a multiple unit in filtering water drawn from the pool.

In backwashing the filter tank assemblies of the multiple unit, it is desirable that each tank assembly be backwashed individually and to the exclusion of the others, and with this in mind, a manually operable control valve 245, preferably in the form of a butterfly valve, is installed in one of the passages of the pump-valve assembly at a point below the T fitting connection thereto. With such valve installed and in its closed condition, the associated filter tank assembly is cut out of the system, leaving the two end tanks still coupled, but either of these may be disconnected from the system by closing the control valve in the line leading to such tank assembly. In other words, by closing any two of the aforementioned three valves, the tank controlled by the remaining valve will remain open to the pump in the system, and by adjusting the valve assembly 41 to the backwash position, such filter tank will be backwashed. When this particular tank has been cleaned, as determined by watching the sight glass 217, its associated control valve may be closed, and one of the other valves may be opened to carry out a backwash operation on the filter tank associated therewith.

By providing the pump-valve unit assembly 5 of the character described and adapted for association with a filter tank assembly 1 of the type described, it becomes readily apparent that the installation of a filter system, whether of the single tank type or multiple unit type, involves a minimum of labor and materials, since the number of pipe connections and quantity of pipe required have been considerably reduced.

Aside from such savings in labor and materials, an exceedingly important additional advantage arising from the present invention relates to the matter of shipping and transportation. Previously, the components of the system such as the pump and valves were mounted as individual units on the tank, and the maze of piping entailed in coupling these various units to one another and to the tank, dictated that the complete assembly be accomplished at the factory. In preparing the same for shipment therefor, the packing and crating required was considerable and costly.

When constructed in accordance with the present invention, the pump-valve assembly unit is not only compact and relatively small in size, but by its very nature is not very susceptible to damage in handling.

The filter tank assembly offers the advantage that it involves nothing particularly complex in its manufacture, and can readily be fabricated in the geographical location of its intended installation. Accordingly it can be readily obtainable by a distributor without incurring the transportation costs which would be involved in having such tank assemblies shipped to him from the factory in conjunction with the pump-tank assembly.

Accordingly, the manufacturer need only ship the pump-valve unit assembly, and thish, because of its rugged construction, need not be crated, but may be shipped in a carton of the corrugated type, designed for such purpose, thus eliminating the costs of crating in addition to reducing the shipping costs to the extent of the weight of such crating.

From the foregoing description of my invention in its preferred form, it will be apparent that the same fulfills all the objects attributed thereto, and while I have illustrated and described the same in its preferred form, it will be apparent that the invention is subject to alteration and modification without department from the underlying principles illustrated and desecribed, and I accordingly do not desire to be limited in my protection to these specific details illustrated and described, except as may be necessitated by the appended claims.

I claim:

1. A filter system assembly construction comprising, a first and second tank assembly each including a tank having a manhole type opening therein, each tank having a false bottom adapted to support filter material while permitting liquid flow thereby, and each tank having a pipe in said tank extending from a point below said false bottom to a point in proximity to the manhole type opening in said tank and supported therein, and filter material in each said tank; a single pump-valve unit assembly supported on said first tank across said opening to form with said first tank assembly a filter system assembly; said pump-valve unit assembly having a first passageway to introduce liquid to be filtered, into the filter system assembly, a second passageway to discharge filtered liquid out of said filter system assembly, and a third passageway to discharge backwash waste water out of said filter system assembly; means coupling said second tank assembly to said pump-valve unit assembly in parallel flow connection to said first tank assembly for simultaneous co-operation with said pump-valve unit assembly in filtering liquid entering said pump-valve unit assembly; and means for selectively disconnecting either of said tank assemblies from said system assembly to enable back washing of each tank assembly independently of the other.

2. A filter system assembly construction comprising, a tank assembly including a tank having a single manhole type opening in the upper end thereof, a false bottom adapted to support filter material while permitting liquid flow thereby, and a pipe in said tank extending from a point below said false bottom to a point in proximity to the upper end of said tank and supported therein, and filter material in said tank; and a pump-valve unit assembly supported on said tank to close said manhole opening, said pump-valve unit assembly including a single piece structure, said single piece structure having flange means cooperating with the peripheral opening forming portion of said tank to span said manhole opening, a pump chamber in said single piece structure, a passageway leading to said pump chamber for intake of liquid and a passageway leading therefrom for discharge of liquid, and a pair of passageways independent of said pump chamber and its associated intake and discharge passageways extending completely through said single piece structure with each of said independent passageways terminating at one end in an opening in the bottom of said single piece structure and exposed to the interior of said filter tank, said single structure having an additional pair of passageways for separately discharging filtered liquid and waste from said filter system assembly, said pump-valve unit assembly also including pump means in said pump chamber, means for effecting a flow connection between said discharge passageway and the other end of of one of said pair of passageways, a diffuser nozzle extending from said single piece structure at the lower terminal opening of said last-mentioned passageway and through said tank opening, and means for effecting flow connection through said tank opening between the lower end of the other of said pair of passageways of said single piece structure and said tank pipe when said pump valve unit assembly is installed on said tank.

3. A filter system assembly construction comprising, a tank assembly including a tank having a single manhole type opening in the upper end thereof, a convex perforated false bottom adapted to support filter material while permitting flow thereby, and a pipe in said tank extending from a point below said false bottom to a point in proximity to the upper end of said tank and welded to said false bottom, and a plurality of layers of filter material in said tank; and a pump valve unit assembly supported on said tank to close said manhole opening, said pump valve unit assembly including a single piece structure, said single piece structure having flange means cooperating with the peripheral opening forming portion of said tank to span said manhole opening, a pump chamber in said single piece structure, a passageway leading to said pump chamber for intake of liquid and a passageway leading therefrom to an opening in a wall of said single piece structure, a pair of passageways extending completely through said single piece structure independent of said pump chamber and its associated intake and discharge passageways, each of said independent passageways terminating at one end in an opening in the bottom of said single piece structure and at its other end in an opening in said forementioned wall, and an additional pair of passageways extending through said single piece structure also independent of said pump chamber and its associated intake and discharge passageways, each of said additional pair of passageways terminating at one end in an opening in said aforementioned wall of said single piece structure and at its other end in a different wall of said single piece structure, the passageways terminal openings in said aforementioned wall lying in a circle, said pump valve unit assembly also comprising a multi-way valve assembly affixed to said single piece structure over the terminal openings in said aforementioned wall and adapted to selectively intercouple said terminal openings in desired combinations, a diffuzer nozzle extending from said single piece structure at the lower terminal opening of one of said first pair of passageways and through said tank opening, pump means in said pump chamber, and means for effecting flow connections through said tank opening between the lower end of the other of said first pair of passageways of said single piece structure and said tank pipe when said pump valve unit assembly is installed on said tank.

4. A pump-valve unit assembly construction for a swimming pool system, including a pool, a filter, and a waste drain, comprising a single piece structure; said single piece structure including a mounting flange at the bottom thereof for cooperating with a filter tank having a single manhole type opening to close said tank opening, a pump chamber in said single piece structure, a passageway leading to said pump chamber for intake of liquid from such pool and a passageway leading therefrom to an opening in the top wall of said single piece structure, a pair of passageways extending through said single piece structure independent of said pump chamber and its associated intake and discharge passageways; each of said independent passageways terminating at one end in an opening in the bottom of said single piece structure and at its other end in an opening in said top wall, and an additional pair of passageways through said single piece structure also independent of said pump chamber and its associated intake and discharge passageways, one of said additional pair of passageways being adapted for connection to such pool and the other to such waste drain, with each of said additional pair of passageways terminating at one end in an opening in said top wall of said single piece structure and at its other end at a different wall of said single piece structure, the passageways terminal openings in said top wall lying in a circle; pump means in said pump chamber; a multi-way valve assembly affixed to said single piece structure over the circularly arranged terminal openings in said aforementioned top wall and adapted in one position, to couple said pump discharge through such filter to such pool, and in another position to reverse flow through such filter and discharge to waste.

(References on following page)

References Cited by the Examiner

UNITED STATES PATENTS

| | | | |
|---|---|---|---|
| 402,659 | 5/89 | Davis | 210—263 |
| 488,297 | 12/92 | Thurston | 210—263 |
| 970,927 | 9/10 | Jones | 103—2 X |
| 1,230,423 | 6/17 | McCaslin | 103—2 X |
| 1,295,211 | 2/19 | Riedler | 103—2 X |
| 2,024,719 | 12/35 | Cocks et al. | 210—258 X |
| 2,298,356 | 10/42 | Eickmeyer et al. | 210—278 X |
| 2,454,124 | 11/48 | Birseh et al. | 210—253 |
| 2,570,258 | 10/51 | McGill et al. | 210—278 X |
| 2,575,923 | 11/51 | McMahan et al. | 103—2 X |
| 2,780,998 | 2/57 | Cilker | 103—106 |
| 2,790,461 | 4/57 | Lightfoot et al. | 210—169 |
| 2,902,157 | 9/59 | Culver | 210—169 |
| 2,961,968 | 11/60 | Thomas et al. | 103—106 |

REUBEN FRIEDMAN, *Primary Examiner.*

HERBERT L. MARTIN, ROBERT M. WALKER, HARRY B. THORNTON, *Examiners.*